United States Patent
McQueen (10) Patent No.: US 6,674,904 B1
(45) Date of Patent: Jan. 6, 2004

(54) CONTOUR TRACING AND BOUNDARY DETECTION FOR OBJECT IDENTIFICATION IN A DIGITAL IMAGE

(75) Inventor: Ward A. McQueen, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/460,650

(22) Filed: Dec. 14, 1999

(51) Int. Cl.⁷ .................................................. G06T 7/60
(52) U.S. Cl. ...................... 382/199; 382/173; 382/205; 382/291
(58) Field of Search ................................ 382/103, 118, 382/104, 165, 170–173, 199, 200, 205, 257, 259, 263, 272, 291

(56) References Cited

U.S. PATENT DOCUMENTS

| 4,097,845 A | * | 6/1978 | Bacus ........................ 340/46.3 |
| 5,119,439 A | * | 6/1992 | Osawa et al. .................. 382/22 |
| 5,233,670 A | * | 8/1993 | Dufour et al. ................. 382/22 |
| 5,459,794 A | * | 10/1995 | Ninomiya et al. ........... 382/145 |
| 5,579,409 A | * | 11/1996 | Vaidyanathan et al. ...... 382/203 |
| 5,923,365 A | * | 7/1999 | Tamir et al. ................. 348/169 |

FOREIGN PATENT DOCUMENTS

JP        5-165963 A   *  7/1993   ............ G06F/15/70

OTHER PUBLICATIONS

Gregory A. Baxes, Digital Image Processing, ISBN 0–471–00949–0, 1994, pp. 98–99.*

* cited by examiner

*Primary Examiner*—Brian Werner
(74) *Attorney, Agent, or Firm*—Trop, Pruner & Hu, P.C.

(57) ABSTRACT

An edge detection algorithm may use contour tracing followed by boundary detection to improve the accuracy of the detected boundaries and to enable the detection of boundaries in cases where the image is either distorted or subject to the effects of noise. The contour tracing and boundary detection may result in an object identification, which if unsatisfactory, may be retried with different threshold values. A high pass gaussian filter may be applied before tracing contours, resulting in the selection of a band limited set of pixel values which are centered around a value of one half the bit depth.

25 Claims, 5 Drawing Sheets

FIG. 1

| OUTER | OUTER | OUTER |
|---|---|---|
| OUTER | TARGET | OUTER |
| OUTER | OUTER | OUTER |

FIG. 2a

RED

| 74 | 102 | 107 |
|---|---|---|
| 110 | 107 | 106 |
| 101 | 102 | 104 |

FIG. 2b

GREEN

| 105 | 95 | 116 |
|---|---|---|
| 101 | 102 | 103 |
| 104 | 105 | 106 |

FIG. 2c

BLUE

| 150 | 151 | 125 |
|---|---|---|
| 126 | 127 | 122 |
| 145 | 146 | 147 |

CONTOUR TRACING AND BOUNDARY DETECTION FOR OBJECT IDENTIFICATION IN A DIGITAL IMAGE

BACKGROUND

This invention relates generally to object identification in connection with digital images.

A number of techniques for detecting the edges of objects depicted in digital images are available including the Laplacian, Rule-based, Prewitt and Sobel techniques. Each of these techniques is subject to a number of shortcomings. In many cases, the edge detection algorithms define edges of features that vary too much in proximity to the actual edge of the object. Some of these techniques define thick multi-pixel wide edges. Such techniques make it difficult to find the actual outline of an object because the edges themselves become objects.

Other techniques are prone to developing too many non-continuous edges. Often these algorithms are unable to detect the entire outline or shape of a given object. Instead, they find sections of the overall object's outline.

All of these techniques are susceptible to noise degradation. Noise greatly affects these edge detection algorithms, causing them to produce what are known as false edges. All these techniques are also processor intensive. To obtain greater accuracy translates to more CPU cycles, usually with little improvement. For example, the Rule based algorithm may take up to thirty seconds on one image and the result may still be unacceptable.

Thus, there is a need for better edge detection algorithms and particularly to algorithms which are more amenable to detecting complex shapes and more amenable to detecting shapes in images which are subject to distortion or noise.

SUMMARY

In accordance with one aspect, a method includes receiving digital image information. The contour of an object depicted in the image information is traced. The boundary of said contour traced object is then detected.

Other aspects are set forth in the accompanying detailed description and claims.

DETAILED DESCRIPTION

Figure 1:
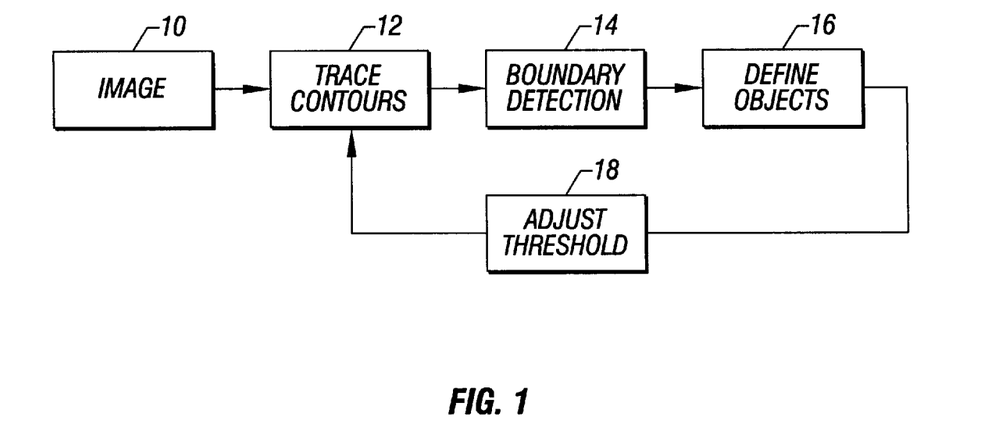
FIG. 1 is a block diagram describing one embodiment of the present invention.

Referring to FIG. 1, a technique for detecting an object in a digital image may begin by taking the digital representation of the image 10 and tracing contours in the image. A contour is defined as a segment that is one pixel wide and one or more pixels in length. Once the contour is detected, as indicated in block 12, a boundary may be detected, as indicated in block 14. A boundary is an unbroken contour. An object is then defined as indicated in block 16 from the boundaries which are detected in the previous block. If the results are unsatisfactory, the threshold of the contour tracing filter and/or other parameters may be adjusted as indicated in block 18 and the flow may be retried.

Contour tracing may involve a contour tracing filter that uses the threshold value of the individual pixels by color component. The resulting contour traced image, after applying a contour tracing filter, may be like a topographical map. The locations of the resulting contours may be determined by the input threshold value.

Boundary detection is a method of following an unbroken set of pixels that possess predefined characteristics, such as an intensity, a color, a luminosity or a location. The combination of contour tracing and boundary detection enables objects to be identified in a digital image, even when the image includes noise.

In effect, contour tracing exposes outlines of objects which in turn facilitates boundary detection. This enhanced contrast facilitates boundary detection. By adjusting the threshold parameters on the contour tracing filter, hard to detect objects may be located such as objects obscured by noise or objects that blend in with other objects. Since each color component produces its own contour, the contours from each color channel can be combined to increase the probability of continuous contours which adds robustness to object detection.

Once a boundary is detected, the positional and directional information for every pixel contained in the boundary may be stored in memory. The directional information is simply one of eight forty-five degree increments around a three by three pixel matrix. Other directional information may be calculated using the pixel's position information relative to its neighboring pixels along with more complex techniques of gradient measurement.

The original image 10 may be subjected to noise filtering or image modification to make it easier for contour tracing to identify the boundaries of certain objects. Thus, the image may be subjected to a combination of one or more of median, high pass, threshold and minimum filtering. In addition, a reference image may be utilized to help the method define a contour or boundary.

After boundary detection, objects may be identified using conventional techniques. For example, a variety of object detection techniques are described in *Digital Image Processing* by Gregory A. Baxes, John Wiley & Sons, Inc., (1994) at pages 168–78.

Referring to FIG. 2, contour tracing may be implemented by "moving" a three by three block of pixels over the array of image pixels making up an image and comparing a middle or target pixel to the outer set of eight pixels within the three by three block to a threshold value. If the target pixel value, such as intensity, is greater than or equal to the threshold value and just one of the outer pixel intensities is less than the threshold value, then the target pixel becomes a lower contour pixel. Reversing the above logic results in an upper contour pixel, wherein if the target pixel intensity is less than or equal to the threshold and any of the outer pixel intensities is greater than the threshold, then the target pixel becomes an upper contour pixel.

Target pixels that do not become contour pixels may be changed to white. The result is a topographical type depiction that contains object outlines that are one pixel wide. As the threshold value is changed, the resulting contour depiction produces different outlines according to the chosen threshold value. The threshold comparison may be applied on a color component by component basis.

Figure 2A:
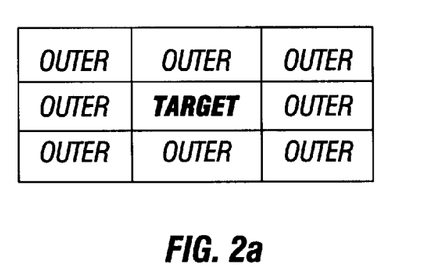
FIG. 2a is a contour matrix illustrating a contour tracing technique in accordance with one embodiment of the present invention.
Figure 2B:
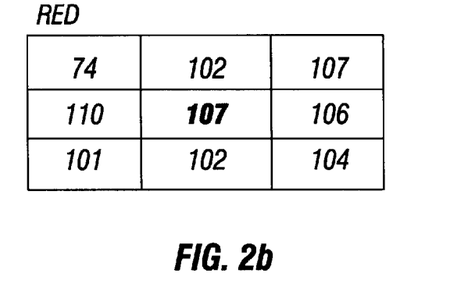
FIGS. 2b, 2c and 2d are examples of the use of the contour matrix shown in FIG. 2a in connection with a hypothetical red, green and blue color components.
Figure 2C:
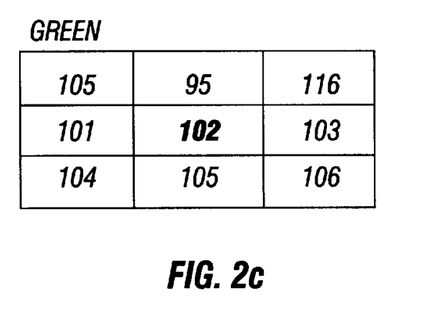
Figure 2D:
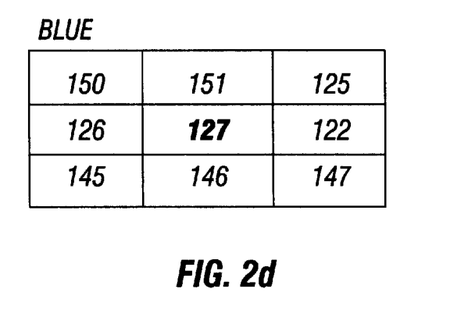

Thus, referring to FIG. 2a, a three by three block of pixels may be defined wherein a center pixel is considered the target pixel and the surrounding pixels are considered the outer pixels. Referring to the examples for the red, green and blue color planes represented by FIGS. 2b, 2c and 2d, respectively, and assuming a hypothetical threshold value of 100, the red channel and the green channel show target pixels that become contour pixels while the blue channel does not. That is, in the case of the red channel shown in FIG. 2b, because the target pixel value is greater than the values of all of the outer pixels except the outer pixel with a value of 74, the red three by three block meets the criteria for defining a contour pixel. Similarly, in the case of the green three by three block shown in FIG. 2c, the pixel having a value of 95 meets the criteria for being a pixel with a value less than the threshold. Therefore, the green block again defines a contour pixel. However, in the case of the blue block shown in FIG. 2d, all the outer pixels exceed the threshold and there is no pixel that is less than the threshold.

Figure 3:
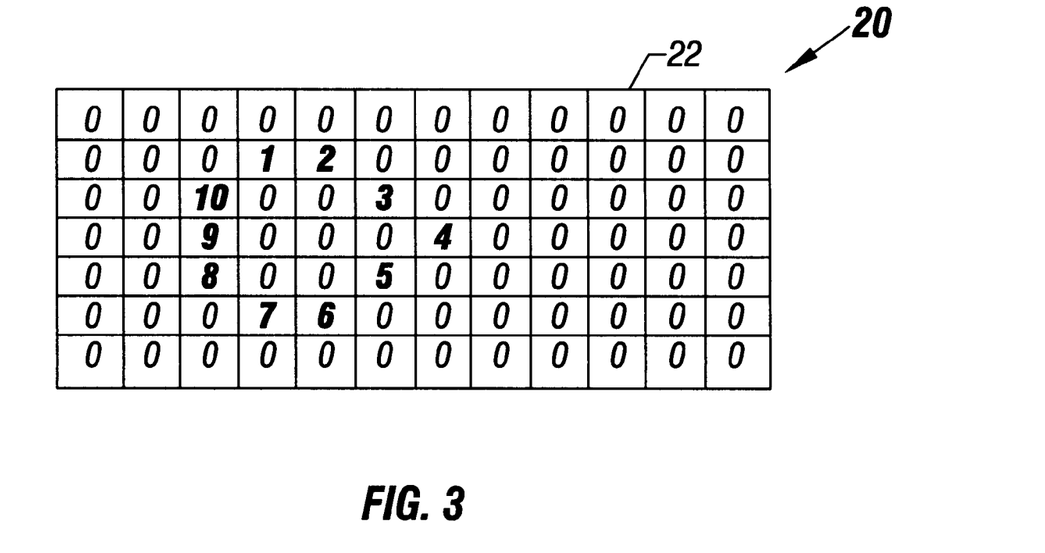
FIG. 3 is a depiction of a contour traced image indicating the pixel values of a plurality of pixels arranged in an oval shape.

Turning next to FIG. 3, a hypothetical pixel array 20 is made up of individual pixels 22 which have been subjected to contour tracing. In this case, the pixels labeled one through ten define an oval shape. The pixels 1 through 10 have values which were exposed using the contour trace filter and the remaining pixels indicated by zeros were not exposed by the contour trace filter.

Figure 3A:
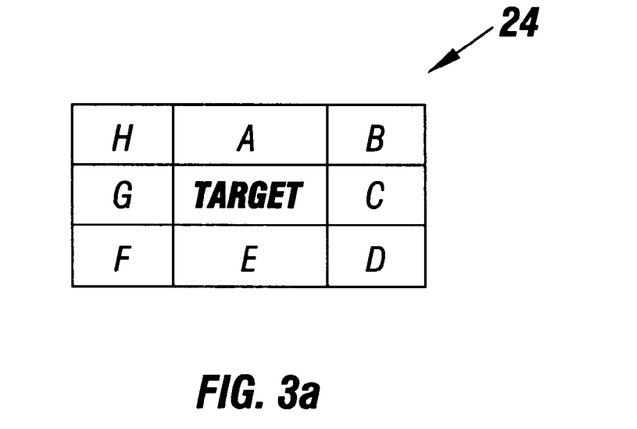
FIG. 3A is a depiction of a three by three block of pixels centered by a target pixel.

The threshold value may be a color, an intensity value or a direction, as examples. In order to obtain a boundary, a three by three block 24, shown in FIG. 3a, is "moved" horizontally across the pixel array row by row, beginning at the top left corner pixel and restarting on the next line beginning at the far left pixel, until a candidate pixel exposed by the contour trace filter is encountered. This pixel becomes a starting pixel for the boundary. To find if there is a new boundary pixel, the three by three block may be searched in a clockwise direction beginning 135 degrees counterclockwise from the direction from which previous contour pixel was found. Thus, referring to FIG. 3a, if for example, the pixel D is a contour pixel, a clockwise scan would begin anew from the pixel A after making the pixel D the new target pixel.

Figure 4A:
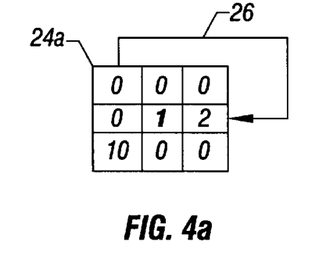
FIGS. 4a–4j show a plurality of analyses undergone to detect the boundary of the oval shape shown in FIG. 3 in an automated fashion in accordance with one embodiment of the invention.

Referring to FIG. 4a, the three by three block 24a is centered over the pixel numbered 1 in FIG. 3. The surrounding pixels (which may be numbered using the convention shown in FIG. 3) are checked to determine if it was identified as a contour pixel. The scanning of the array 20 begins in the upper left-hand corner in FIG. 3, in one embodiment of the invention, and moves from left to right until a contour pixel is located. In this example, the first such pixel is the pixel numbered 1 in FIG. 3. Thus, the three by three block 24 is recentered over the pixel number 1 which is identified as the target pixel using the convention shown in FIG. 3a. The clockwise scan indicated by the arrow 26 begins from pixel position H (see FIG. 4a). This is because the initial hit occurred at pixel position C. By initial "hit", it is intended to refer to the fact that a pixel was first located at position C as the three by three block was moved left to right beginning in the upper left-hand corner of the array shown in FIG. 3.

Figure 4B:
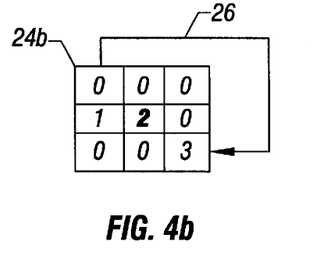

Thus, a result of the scan begun in a clockwise direction as indicated by the arrow 26 from the initial pixel position H, the next circularly scanned pixel which was exposed as a contour pixel is the pixel in the position C which is pixel number 2. Thus, as shown in FIG. 4b, pixel number 2 is then aligned as the target pixel and the three by three block is recentered over the pixel number 2. Since the last hit was at position C, the scan begins 135 degrees counterclockwise from the direction from which the previous pixel had been found, i.e., at position H.

Figure 4C:
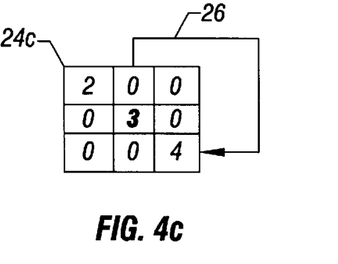

Thus, as shown in FIG. 4b, the scan that began at position H locates the pixel number 3 located in the position D. The three by three block is moved to center the block over the pixel number 3 and this time the scan begins from the pixel location A which is 135 degrees clockwise from the direction from which the previous pixel had been found. The scan begins anew in a clockwise fashion as indicated in FIG. 4c. Again, the pixel 4 is located which is at position D.

Figure 4D:
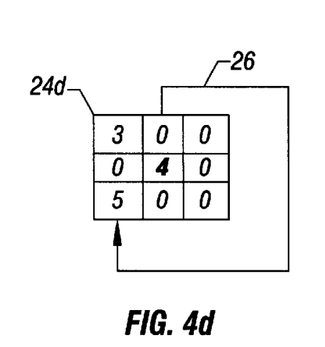
Figure 4E:
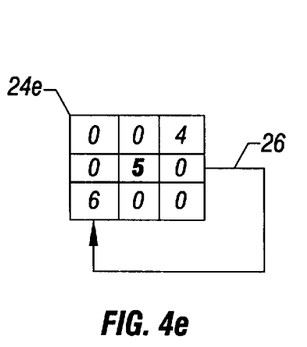
Figure 4F:
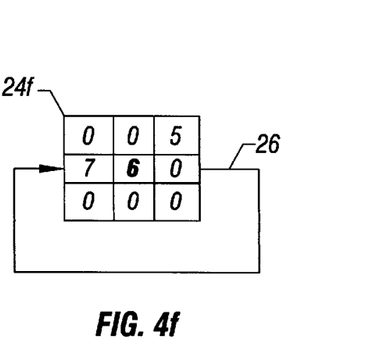
Figure 4G:
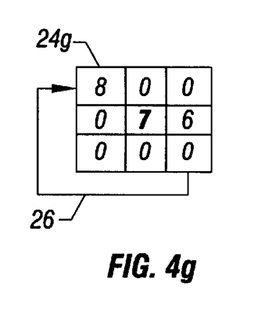
Figure 4H:
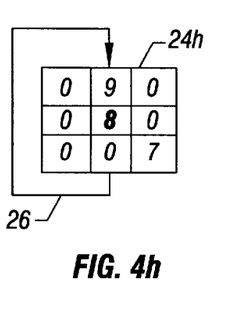
Figure 4I:
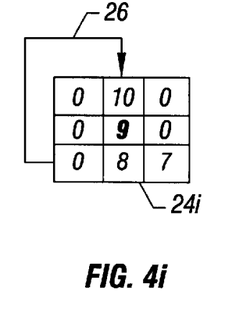
Figure 4J:
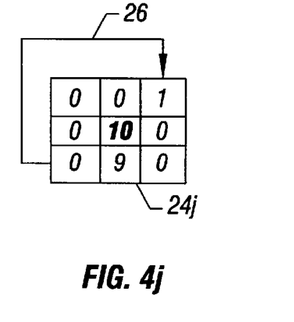

Thus, as indicated in FIG. 4d, the pixel 4 is made the target pixel and the scan begins from the pixel A which is 135 degrees counterclockwise from the direction from which the previous pixel has been found.

This time the clockwise scan begins from position A and locates the pixel number 5 in position F. Moving through FIGS. 4e, 4f, 4g, 4h, 4i and 4j, the scan continues in a clockwise fashion, beginning 135 degrees counterclockwise from the direction from which the previous pixel had been found in one embodiment of the invention. The technique follows the pixels in order finding one pixel after another along the boundary without backtracking.

To find the next boundary, the first pixel encountered on the left to right horizontal sweep, beginning at the top of the image, that is not marked as a boundary pixel contained in a previously found boundary, becomes the starting pixel for the next boundary. Once a pixel has been marked as a boundary pixel, it can no longer be used as the starting pixel of a new boundary; however, it can be used as a pixel within another boundary.

In another embodiment of the present invention, the scanning may begin at the lower right-hand corner as an example. In such case, it may be advantageous to scan in a counterclockwise rather a clockwise fashion. Thus, the technique can begin at any predetermined location within the array of pixels and may proceed in a regular fashion using the technique described above to locate each pixel in the boundary one after another. As these pixels are located, they may be stored using any of the techniques described previously.

Figure 5:
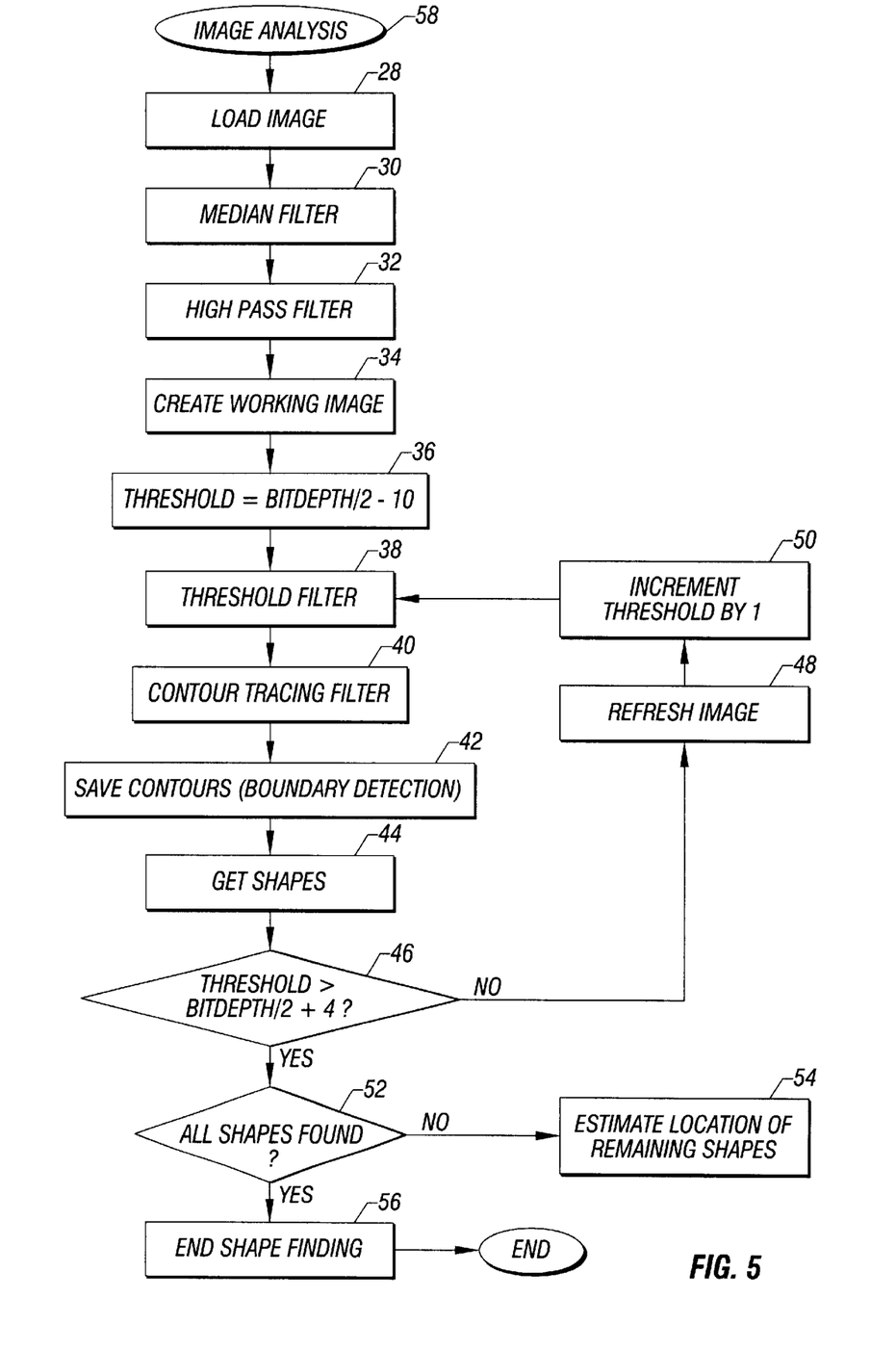
FIG. 5 is a flow diagram for one embodiment of the present invention.

One example of the application of these techniques, illustrated in FIG. 5, begins by loading an image, indicated by block 28. After the image is loaded, it can be subjected to median filtering (block 30). A median filter is applied to the image to reduce noise and thus, reduce "false" contours. This may speed up the algorithm.

Next, as indicated in block 32, the image is high pass filtered. The particular high pass filter used in this method is well suited to enhancing the effectiveness of the contour trace filter in exposing shapes through contours. If the boundary is based on shapes regardless of color, the high pass filter modifies the luminosity histogram of the image by consolidating the color channel intensities to within a very thin and even distribution around the mean value of the bit depth, such as one half the bit depth. The bit depth indicates the number of bits used to represent a pixel value, for example in an 8 bit per channel image, the bit depth is 256.

A spatial high pass filter defines high frequency elements in an image as a large difference in intensity values between two pixels. The result of an intensity difference between a pixel with a luminosity of zero and a pixel with a luminosity of one hundred is the same result as the difference between two pixels with luminosities of 125 and 225. Therefore, the resulting image is a representation of these differences. This representation may be displayed as gradient levels that fall above or below the highest intensity difference possible. For a eight bit per channel image, this intensity value is 128.

A high pass filter may be based on gaussian distributed curve. One parameter that the filter accepts is a radius or variance value that determines the width of the gaussian vector. The vector is defined as follows:

$$p(x) = \frac{1}{\sqrt{2\pi\sigma^2}} \exp\left[\frac{-(x-u)^2}{2\sigma^2}\right]$$

where σ is the radius of neighboring pixels that affect a target pixel.

A boundary detection technique may use criteria to keep or reject a contour. These criteria, in one embodiment of the present invention, may be that the contour must close in upon itself, i.e. it must end where it began. The number of pixels in the contour may not be greater than a maximum determined to be more than enough to define the perimeter of a typical shape. The number of pixels in a contour preferably should not be less than the minimum number determined to be adequate to define the perimeter of a typical shape.

A working image is then created so as to maintain the current filtered copy of the image in memory because it will be used repeatedly in the following steps. Next, a threshold filter is applied (block 38). The threshold value for the threshold filter can be set to be anywhere near the mean of the histogram of the high pass filtered image (usually within ±10) to generate good results. Next the contour tracing filter is applied (block 40) and then boundary detection (block 42). After boundary detection, the boundaries stored in memory may be analyzed to identify any objects found. A check at diamond 46 determines if the current threshold used by the threshold filter is still within a distance of approximately ±10 of the histogram mean. If it is and the object of interest was not found, then the threshold is incremented, usually by 1 (block 50). The original filtered working image is retrieved and the process is repeated beginning at the threshold filter. If the threshold goes beyond the usable values, usually (±10 above and below the mean of the high pass filtered histogram), then the process loop is exited. If all the objects of interest have not been found (diamond 52), then it may be possible to estimate the location of the missing objects based on the location of the objects that have been found (block 54).

Boundary detection may be applied to the image after the threshold filter has been applied. Boundary detection may trace the contours and store the location information for each contour. The boundary detection algorithm can provide the location and direction information for every contour in the image. This however would be very inefficient.

It is better to give the boundary detection algorithm criteria with which to determine whether to use a given edge contour. For example, the criteria may be that the contour must close in upon itself, i.e. it must end where it began. Similarly, the criteria may be that the number of pixels in the contour should not be greater than the maximum determined to be more than enough to define the perimeter of a target shape. Likewise, the criteria may call for the number of pixels in the contour to be greater than the minimum determined to be sufficient to define the perimeter of the target shape.

The outline or shape of a particular target object may be used as a model for the boundary detection algorithm. Other criteria may be provided based on the particular shapes which are expected to be found in a given image. In this way, instead of detecting all of the contours, the boundary detection algorithm may search particularly for those shapes which are expected to be present in a given image, facilitating the analysis and improving its results.

Figure 6:
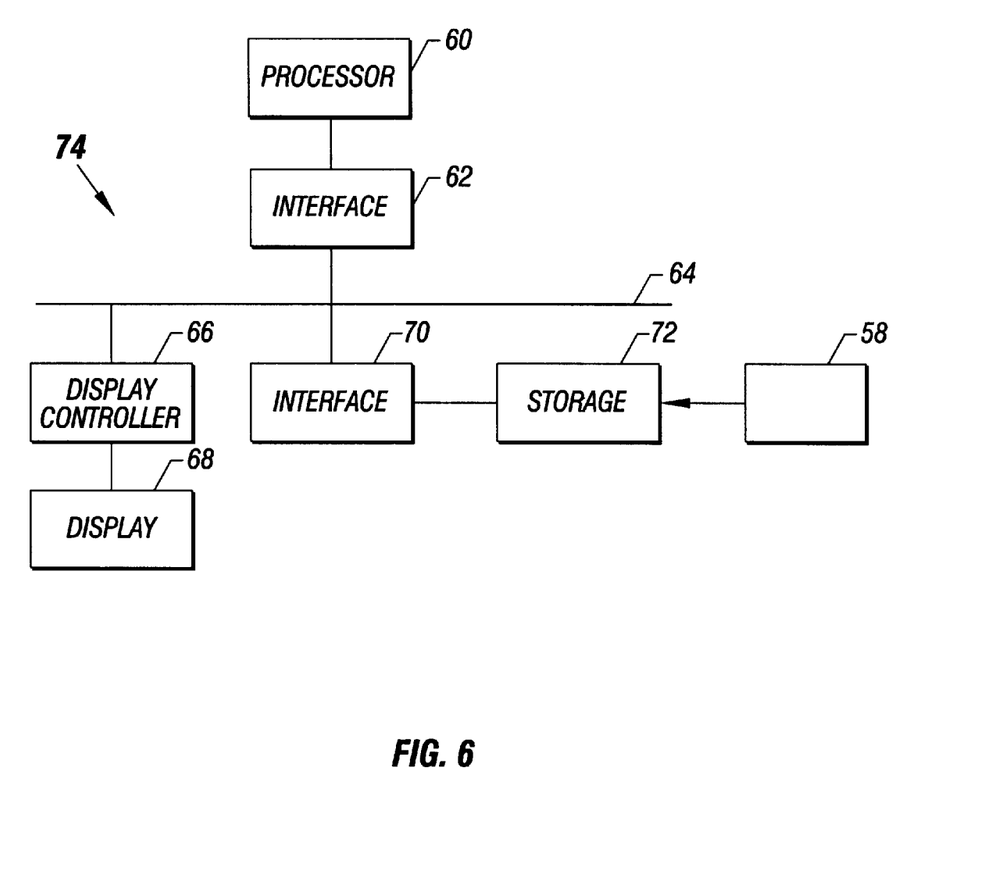
FIG. 6 is a block depiction of a processor-based system in accordance with one embodiment of the present invention.

As shown in FIG. 6, the software 58 may be stored on a processor-based system 74. The system 74 may include a processor 60 coupled through an interface 62 to a bus 64. The interface 62 may be a bridge for example. A display controller 66 couples a display 68 to the bus 64. An interface 70 which may also be a bridge couples the storage 72 to the bus 64. The storage 72 may be a hard disk drive for example. The storage 72 stores the software 58. Thus, the software 58 may include instructions for execution by the processor 60.

Embodiments of the present invention may provide improved accuracy. The contour tracing filter may provide an edge which is very close to the true edge of the object. The contour filter, in one embodiment of the invention, guarantees a one pixel wide edge leaving no ambiguity as to the true outline of an object. The only purpose of the contour trace filter in this invention is to find continuous edges around objects. The use of high pass and median filtering improves the accuracy in high noise environments. Some embodiments may be relatively independent of image size, color and the location of objects in the image. Moreover, some embodiments are amenable to a high degree of optimization. A contour tracing filter may be applied very quickly and is amenable to using optimized coding. Such methods may be made more powerful by using inherent parameters like the contour filter threshold value to vary the contour criteria on different color channels, overlaying several contour traced images using different threshold values. Moreover, external filters may be applied that further enhance the power of such methods.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving digital image information;

tracing the contour of an object depicted in said image information with a threshold value;

detecting the boundary of said contour traced object;

evaluating results of tracing the contour and detecting the boundary; and adjusting the threshold value based on the results.

2. The method of claim 1 further including setting said threshold value initially as a function of a bit depth of the digital image information.

3. The method of claim 1 further including subjecting the digital image information to high pass gaussian filtering.

4. The method of claim 3 including median filtering said digital image information before high pass gaussian filtering.

5. The method of claim 3 including threshold filtering after high pass gaussian filtering.

6. The method of claim 1 wherein contour tracing includes comparing a value of a target pixel to a corresponding value of a plurality of neighboring pixels.

7. The method of claim 6 including determining whether the target pixel and any of the neighboring pixels have a value above a predetermined threshold value.

8. The method of claim 7 including analyzing said pixels based on color.

9. The method of claim 1 wherein detecting the boundary includes analyzing a set of eight pixels surrounding a target pixel and locating a surrounding pixel which was exposed by the contour trace filter.

10. The method of claim 9 including scanning the values of said surrounding pixels one after another in a predetermined sequence.

11. The method of claim 10 including scanning said pixels in a clockwise arrangement.

12. An article comprising a medium storing instructions that cause a processor-based system to:
   trace the contour of an object depicted in image information with a threshold value;
   detect the boundary of said contour traced object; and
   evaluate results of contour tracing and boundary detection, and adjust the threshold value based on said results.

13. The article of claim 12 further storing instructions that cause a processor-based system to set said threshold value initially as a function of a bit depth of said image information.

14. The article of claim 12 further storing instructions that cause a processor-based system to subject the image information to high pass gaussian filtering.

15. The article of claim 14 further storing instructions that cause a processor-based system to median filter said image information before high pass gaussian filtering.

16. The article of claim 14 further storing instructions that cause a processor-based system to threshold filter said image information after high pass gaussian filtering.

17. The article of claim 12 further storing instructions that cause a processor-based system to compare a value of a target pixel to a corresponding value of a plurality of neighboring pixels.

18. The article of claim 17 further storing instructions that cause a processor-based system to determine whether the target pixel is below a predetermined threshold value and any of the neighboring pixel values are above the predetermined threshold value.

19. The article of claim 18 further storing instructions that cause a processor-based system to analyze said pixels based on color.

20. The article of claim 18 further storing instructions that cause a processor-based system to analyze a set of eight pixels surrounding a target pixel and locate a surrounding pixel which exceeds a predetermined value.

21. The article of claim 20 further storing instructions that cause a processor-based system to scan the values of said surrounding pixels one after another in a predetermined sequence.

22. The article of claim 21 further storing instructions that cause a processor-based system to scan said pixels in a clockwise order.

23. The article of claim 22 further storing instructions that cause a processor-based system to scan said pixels beginning from a point counterclockwise from the direction in which a previous pixel exceeded the predetermined threshold value.

24. A digital image processing system comprising:
   a processor; and
   a storage coupled to said processor, said storage storing instructions that cause a processor-based system to trace a contour of an object depicted in digital image information with a threshold value; detect the boundary of said contour traced object; evaluate the results of contour tracing and boundary detection; and adjust the threshold value based on said results.

25. The digital image processing system of claim 24, wherein the storage further stores instructions to cause the processor-based system to subject the digital image information to high pass gaussian filtering.

* * * * *

UNITED STATES PATENT AND TRADEMARK OFFICE
CERTIFICATE OF CORRECTION

PATENT NO.    : 6,674,904 B1
DATED         : January 6, 2004
INVENTOR(S)   : Ward A. McQueen It is certified that error appears in the above-identified patent and that said Letters Patent is hereby corrected as shown below:

<u>Column 8,</u>
Line 11, "18" should be -- 12 --.

Signed and Sealed this

Twenty-third Day of March, 2004

JON W. DUDAS
*Acting Director of the United States Patent and Trademark Office*